(12) United States Patent
Harrison

(10) Patent No.: US 12,063,058 B2
(45) Date of Patent: Aug. 13, 2024

(54) FRONT END MODULE WITH SWITCHABLE FILTER

(71) Applicant: SKYWORKS SOLUTIONS, INC., Irvine, CA (US)

(72) Inventor: Jose Mari Elizalde Harrison, Newburyport, MA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 215 days.

(21) Appl. No.: 17/667,363

(22) Filed: Feb. 8, 2022

(65) Prior Publication Data

US 2022/0255574 A1 Aug. 11, 2022

Related U.S. Application Data

(60) Provisional application No. 63/147,268, filed on Feb. 9, 2021.

(51) Int. Cl.
| | | |
|---|---|---|
| *H04B 1/18* | (2006.01) | |
| *H04B 1/04* | (2006.01) | |
| *H04B 1/16* | (2006.01) | |
| *H04B 1/44* | (2006.01) | |

(52) U.S. Cl.
CPC ............. *H04B 1/18* (2013.01); *H04B 1/0483* (2013.01); *H04B 1/1615* (2013.01); *H04B 1/44* (2013.01)

(58) Field of Classification Search
CPC ...... H04B 1/18; H04B 1/0483; H04B 1/1607; H04B 1/1615; H04B 1/40; H04B 1/401; H04B 1/406; H04B 1/44; H04B 1/48
See application file for complete search history.

(56) References Cited

U.S. PATENT DOCUMENTS

| | | | |
|---|---|---|---|
| 4,847,629 A | 7/1989 | Shimazaki | |
| 7,555,276 B2 | 6/2009 | Wilcox | |
| 8,325,632 B2* | 12/2012 | Gorbachov | H04B 1/48 455/83 |
| 8,923,169 B2* | 12/2014 | Poulin | H04B 1/44 455/73 |
| 9,391,650 B2* | 7/2016 | Aparin | H04B 1/0458 |
| 9,838,069 B2* | 12/2017 | Emmanuel | H04B 1/48 |
| 10,673,484 B2* | 6/2020 | See | H04B 1/0067 |
| 2006/0091960 A1 | 5/2006 | Phillips et al. | |
| 2010/0009641 A1 | 1/2010 | Osman et al. | |
| 2015/0070096 A1 | 3/2015 | Watanabe et al. | |
| 2018/0034152 A1 | 2/2018 | Mura et al. | |
| 2020/0137690 A1 | 4/2020 | Min et al. | |
| 2022/0166447 A1 | 5/2022 | Poulin et al. | |

* cited by examiner

*Primary Examiner* — Quochien B Vuong
(74) *Attorney, Agent, or Firm* — Lando & Anastasi, LLP

(57) ABSTRACT

A front end module for a wireless device. The front end module comprises an input port to receive a first radio frequency signal, a power amplifier, an antenna port, a first transmit/receive path, a second transmit/receive path, a switch, and a switching circuit. The power amplifier is coupled to the input port and configured to amplify the first radio frequency signal. The antenna port provides the amplified first radio frequency signal to an antenna. The first transmit/receive path includes a filter, and the switch includes a first contact coupled to the first transmit/receive path, a second contact coupled to the second transmit/receive path, and a third contact coupled to the antenna port. The switching circuit is configured to selectively couple the power amplifier to the antenna port via one of the first transmit/receive path and the second transmit/receive path.

21 Claims, 3 Drawing Sheets

FRONT END MODULE WITH SWITCHABLE FILTER

CROSS-REFERENCE TO RELATED APPLICATIONS

This application claims priority under 35 U.S.C. § 119(e) to U.S. Provisional Patent Application Ser. No. 63/147,268, titled FRONT END MODULE WITH SWITCHABLE FILTER, filed Feb. 9, 2021, which is incorporated herein by reference in its entirety for all purposes.

BACKGROUND

Technical Field

The present disclosure relates generally to front end modules (FEM). More particularly, aspects of the present disclosure relate to systems and methods for improving FEM performance and configurability using switchable filters.

SUMMARY

According to an aspect of the present disclosure a front end module for a wireless device is provided. The front end module includes an input port configured to receive an input radio frequency signal, a power amplifier, a low-noise amplifier, an antenna port, an output port, a transmit path, a receive path, a filter, and a first switching circuit. The power amplifier is coupled to the input port and is configured to amplify, in a transmit mode of operation, the input radio frequency signal to provide a first radio frequency signal. The antenna port is configured to be coupled to an antenna, to receive a second radio frequency signal from the antenna in a receive mode of operation, and to transmit the first radio frequency signal from the power amplifier to the antenna in the transmit mode of operation. The low-noise amplifier is configured, in the receive mode of operation, to amplify the second radio frequency signal received from the antenna port, and the output port is configured to receive the amplified second radio frequency signal from the low-noise amplifier. The transmit path is coupled between the power amplifier and the antenna port and is configured to provide, in the transmit mode of operation, the first radio frequency signal from the power amplifier to the antenna port, and the receive path is coupled between the low-noise amplifier and the antenna port and is configured to provide, in the receive mode of operation, the second radio frequency signal from the antenna port to the low-noise amplifier. The first switching circuit is positioned in the transmit and receive paths and is configured to selectively apply the filter to the transmit path and/or the receive path.

According to one embodiment, the first switching circuit is a switch matrix.

According to another embodiment, the first switching circuit is configured to apply the filter to the transmit path and/or the receive path in a first mode of operation and to remove the filter from the transmit path and/or the receive path in a second mode of operation.

In one example, the first mode of operation corresponds to a first WiFi application or location of use and the second mode of operation corresponds to a second WiFi application or location of use.

In another example, the first radio frequency signal is configured to be transmitted in a channel of a plurality of channels corresponding to a WiFi band and the front end module is configured to switch between the first and second modes of operation on a channel-by-channel basis.

In a further example, the front end module is configured to operate in the first mode of operation when transmitting in an outer channel of the plurality of channels and in the second mode of operation when transmitting in an inner channel of the plurality of channels. According to aspects of this example, operating in the first mode of operation when transmitting in outer channels and in the second mode of operation when transmitting in inner channels allows the front end module to transmit the first radio frequency signal at a substantially similar power level across the plurality of channels while minimizing out of band noise generation.

According to another embodiment, the front end module further comprises a second switching circuit configured to selectively couple the antenna port to one of the filter and the first switching circuit.

In one example, the second switching circuit is a single pole double throw switch. In another example, the power amplifier, the low-noise amplifier, the filter, the first switching circuit, and the second switching circuit are integrated in a common package.

In a further example, at least two of the power amplifier, the low-noise amplifier, the filter, the first switching circuit, and the second switching circuit have impedances that are directly matched to reduce impedance transformation losses.

According to another aspect of the present disclosure, a front end module for a wireless device is provided. The front end module comprises an input port to receive a first radio frequency signal, a power amplifier, an antenna port, a first transmit/receive path, a second transmit/receive path, a switch, and a switching circuit. The power amplifier is coupled to the input port and is configured to amplify the first radio frequency signal. The antenna port provides the amplified first radio frequency signal to an antenna. The first transmit/receive path includes a filter, and the switch includes a first contact coupled to the first transmit/receive path, a second contact coupled to the second transmit/receive path, and a third contact coupled to the antenna port. The switching circuit is configured to selectively couple the power amplifier to the antenna port via one of the first transmit/receive path and the second transmit/receive path.

According to one embodiment, the switching circuit is configured to couple the power amplifier to the antenna port via the first transmit/receive path in a first mode of operation and to couple the power amplifier to the antenna port via the second transmit/receive path in a second mode of operation.

In one example, the front end module is configured to operate in the first mode of operation for a first WiFi application or location of use and the second mode of operation for a second WiFi application or location of use.

In another example, the first radio frequency signal is configured to be transmitted in a channel of a plurality of channels corresponding to a WiFi band and the front end module is configured to switch between the first and second modes of operation on a channel-by-channel basis. In accordance with an aspect of this example, the front end module is configured to operate in the first mode of operation when transmitting in an outer channel of the plurality of channels and in the second mode of operation when transmitting in an inner channel of the plurality of channels. In accordance with a further aspect of this example, operating in the first mode of operation when transmitting in outer channels and in the second mode of operation when transmitting in inner channels allows the front end module to transmit the first radio frequency signal at a substantially similar power level across the plurality of channels while minimizing out of band noise generation.

According to another embodiment, the front end module further comprises an output port and a low noise amplifier, the low-noise amplifier being configured to amplify a second radio frequency signal received from the antenna port and provide the amplified second radio frequency signal to the output port.

In one example, the switching circuit is further configured to selectively couple the low noise amplifier to the antenna port via one of the first transmit/receive path and the second transmit/receive path.

In another example, the switching circuit is configured to couple the low-noise amplifier to the antenna port via the first transmit/receive path in the first mode of operation and to couple the low-noise amplifier to the antenna port via the second transmit/receive path in the second mode of operation.

In yet another example, the power amplifier, the low-noise amplifier, the filter, the switch, and the switching circuit are integrated in a common package.

In yet a still further example, at least two of the power amplifier, the low-noise amplifier, the filter, the switch, and the switching circuit have impedances that are directly matched to reduce impedance transformation losses.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and examples are directed to front end modules and components thereof, and to devices, modules, and systems incorporating same.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
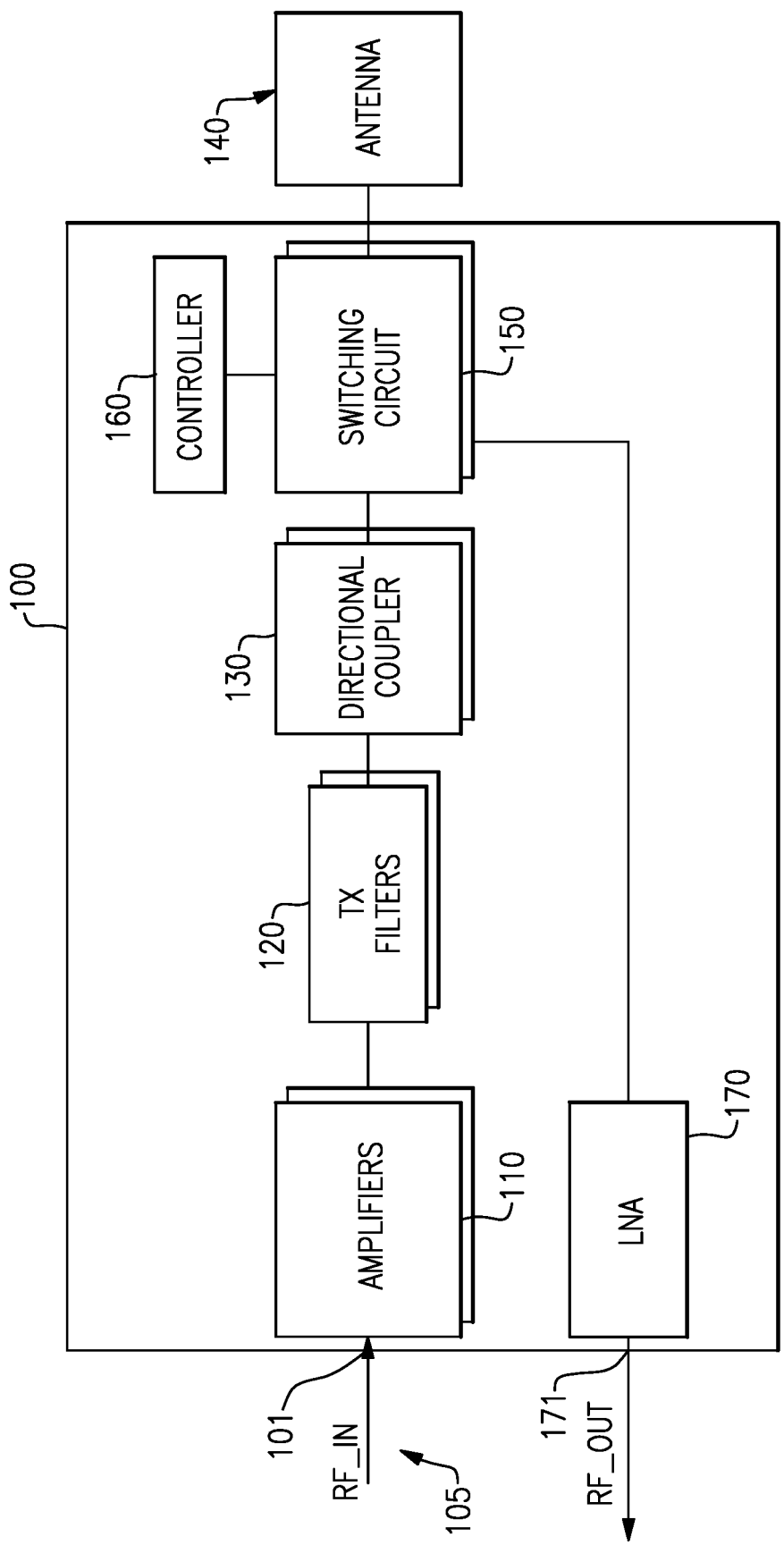
FIG. 1 is a block diagram of a front end module.

FIG. 1 is a block diagram illustrating an example of a typical arrangement of a Radio-Frequency (RF) "front end" sub-system or module (FEM) 100 as may be used in a communications device, such as a mobile phone, for example, to transmit and receive RF signals. The FEM 100 shown in FIG. 1 includes a transmit path (TX) configured to provide signals to an antenna for transmission and a receive path (RX) to receive signals from the antenna. In the transmit path (TX), a power amplifier module 110 provides gain to an RF signal 105 input to the FEM 100 via an input port 101, producing an amplified RF signal. The power amplifier module 110 can include one or more Power Amplifiers (PA).

The FEM 100 can further include a filtering sub-subsystem or module 120, which can include one or more filters. In some examples, a directional coupler 130 can be used to extract a portion of the power from the RF signal traveling between the power amplifier module 110 and an antenna 140 connected to the FEM 100. The antenna 140 can transmit the RF signal and can also receive RF signals. A switching circuit 150, also referred to as an Antenna Switch Module (ASM), can be used to switch between a transmitting mode and receiving mode of the FEM 100, for example, or between different transmit or receive frequency bands. In certain examples, the switching circuit 150 can be operated under the control of a controller 160.

The FEM 100 can also include a receive path (RX) configured to process signals received by the antenna 140 and provide the received signals to a signal processor (e.g., a transceiver) via an output port 171. The receive path (RX) can include one or more Low-Noise Amplifiers (LNA) 170 to amplify the signals received from the antenna. Although not shown, the receive path (RX) can also include one or more filters for filtering the received signals.

In many cases, front end modules, such as the FEM 100, can be configured for use in WiFi systems. WiFi FEMs may include filters (e.g., filtering sub-system 120) configured for specific WiFi operating frequencies and bands. In one example, for the 2.4~2.5 GHz WiFi band, filters may be applied to enhance channel performance (e.g., CH1~CH11). In some examples, such filters may be applied or removed depending on the application. For example, the 2.4~2.5 GHz WiFi band filters may be applied for operation in the North American market while being optional or unnecessary for operation in the European market. Likewise, for WiFi UNII-1 through UNII-8, filters may be applied to separate the legacy UNII-1 through UNII-3 bands from the UNII-5 through UNII-8 bands and the filters may be removed for broadband applications covering UNII-1 through UNII-8.

As described above, it may be necessary to selectively apply/remove filters used with WiFi FEMs depending on the application or location (e.g., country) in which it is used. In some cases, to selectively apply/remove such filters, external switches can be utilized to switch through or bypass the filters to achieve desired FEM configurations. However, connections/traces to the external switches (or the switches themselves) can provide additional sources of loss that can degrade performance. Likewise, the inclusion of additional components may result in cumulative component tolerances which contribute to performance degradation.

In some cases, when the filters are removed, the output power of the FEM (or the power amplifier) may be reduced. For example, the output power may be reduced for edge channels (e.g., CH1, CH11, etc.) to minimize out of band (OOB) noise or interference generated by the FEM. As such, the output power level used for edge channels may be up to 75% less than the output power level used for center channels (e.g., CH6). In some examples, this reduction in output power can degrade the performance (e.g., range) of edge channels relative to center channels, discouraging use of the edge channels.

As such, an improved front end module (FEM) is provided herein. In at least one embodiment, the FEM includes a filter and a switch matrix configured to selectively apply or remove the filter from the transmit and/or receive paths of the FEM. In some embodiments, component impedances can be matched within the FEM to reduce losses and improve performance.

Figure 2:
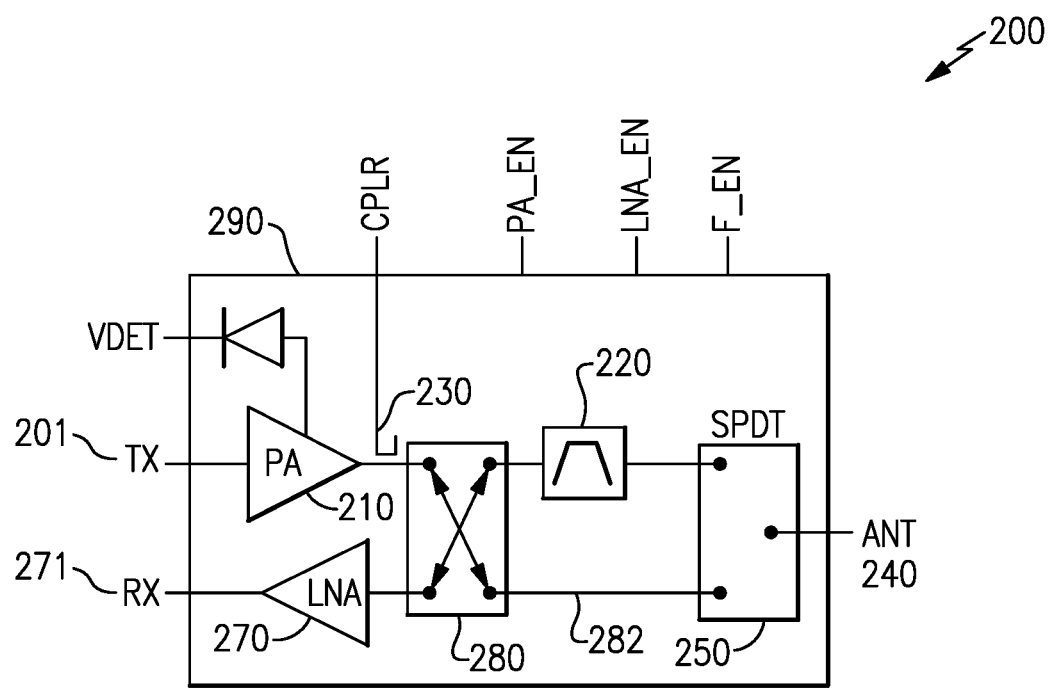
FIG. 2 is a block diagram of a front end module in accordance with aspects described herein.

FIG. 2 is a block diagram illustrating a FEM 200 in accordance with aspects described herein. In one example, the FEM 200 includes an input port 201, a power amplifier (PA) 210, a filter 220, a coupler 230, an antenna port 240, a switching circuit 250, a low noise amplifier (LNA) 270, an output port 271, and a switch matrix 280. As shown, the components of the FEM 200 can be included in a package 290. In some examples, the components of the FEM 200 may be included on a single substrate; however, in other examples, the components may be included on two or more substrates included in the package 290.

The FEM 200 includes a transmit path (TX) configured to provide signals to the antenna port 240 for transmission and a receive path (RX) to receive signals from the antenna port 240. In the transmit path (TX), the power amplifier module 210 provides gain to an RF signal input to the FEM 200 via the input port 201, producing an amplified RF signal. In some examples, the power amplifier module 210 can include multiple power amplifiers (and multiple gain stages).

In one example, the directional coupler 230 can be used to extract a portion of the power from the RF signal traveling between the power amplifier 210 and the antenna port 240. In some examples, the extracted portion of the RF signal is used to adjust the gain of the power amplifier 210. The antenna port 240 provides the RF signal to an antenna for transmission and also receives RF signals from the antenna. The switching circuit 250 can be used to switch between a transmitting mode and receiving mode of the FEM 200, for example, or between different transmit or receive frequency bands. In certain examples, the switching circuit 250 can be operated under the control of a controller (not shown). In some examples, the switching circuit 250 is configured as a single-pole double-throw (SPDT) switch.

The FEM 200 also includes a receive path (RX) configured to process signals received at the antenna port 240 and provide the received signals to a signal processor (e.g., a transceiver) via the output port 271. The receive path (RX) includes the LNA 270, which is configured to amplify the signals received from the antenna port 240.

In some examples, the FEM 200 is configured to receive one or more control signals. For example, a power amplifier enable signal (PA_EN), an LNA enable signal (LNA_EN), and a filter enable signal (F_EN). In one example, the filter enable signal is used to control or operate the switch matrix 280 and/or the switching circuit 250.

In one example, the switch matrix 280 is configured to selectively apply or remove the filter 220. For example, when the filter 220 is to be applied, the switch matrix 280 can be controlled such that RF signals in the transmit path (TX) and/or the receive path (RX) are provided through the filter 220. Likewise, when the filter 220 is to be removed, the switch matrix 280 can be controlled such that RF signals in the transmit path (TX) and/or the receive path (RX) bypass the filter 220 via a bypass path 282. In some examples, the filter 220 is a bulk acoustic wave (BAW) filter.

More specifically, the FEM 200 may be configured to operate in various modes of operation. For example, in a first transmit mode of operation, the switching circuit 250 and the switch matrix 280 are controlled such that the filter 220 is applied to the transmit path (TX). In the first transmit mode of operation, the switching matrix 280 is controlled to couple the power amplifier 210 to the filter 220 and the switching circuit 250 is controlled to couple the filter 220 to the antenna 240. As such, in the first transmit mode of operation, RF signals in the transmit path (TX) are amplified by the power amplifier 210 and filtered by the filter 220 before being provided to the antenna port 240 for transmission via the antenna. Likewise, in a second transmit mode of operation, the switching circuit 250 and the switch matrix 280 are controlled such that the filter 220 is removed from the transmit path (TX). In the second transmit mode of operation, the switching matrix 280 is controlled to couple the power amplifier 210 to the bypass path 282 and the switching circuit 250 is controlled to couple the bypass path 282 to the antenna port 240. As such, in the second transmit mode of operation, RF signals in the transmit path (TX) are amplified by the power amplifier 210 and provided to the antenna port 240 for transmission via the antenna, bypassing the filter 220.

Similarly, in a first receive mode of operation, the switching circuit 250 and the switch matrix 280 are controlled such that the filter 220 is applied to the receive path (RX). In the first receive mode of operation, the switching circuit 250 is controlled to couple the filter 220 to the antenna port 240 and the switching matrix 280 is controlled to couple the filter 220 to the LNA 270. As such, in the first receive mode of operation, RF signals in the receive path (RX) are filtered by the filter 220 and amplified by the LNA 270 before being provided to the output port 271. Likewise, in a second receive mode of operation, the switching circuit 250 and the switch matrix 280 are controlled such that the filter 220 is removed from the receive path (RX). In the second receive mode of operation, the switching circuit 250 is controlled to couple the bypass path 282 to the antenna port 240 and the switching matrix 280 is controlled to couple the bypass path 282 to the LNA 270. As such, in the second receive mode of operation, RF signals in the receive path (RX) are amplified by the LNA 270 and provided to the output port 271, bypassing the filter 220.

In one example, the FEM 200 is configured for use in WiFi systems. In some examples, the filter 220 can be configured for specific WiFi operating frequencies or bands (e.g., 2.4 GHz). As described above, filters in WiFi FEMs may be applied or removed depending on the application or location of use. As such, the operating modes described above may correspond to specific WiFi applications. For example, the filter 220 may be applied for operation in the North American market while being removed for operation in the European market. As such, the FEM 200 may be configured to operate in the first transmit mode and/or the first receive mode for operation in the North American market and in the second transmit mode and/or the second receive mode for operation in the European market. Likewise, the FEM 200 may be configured to operate in the first transmit mode and/or the first receive mode for 5~6 GHz and 6~7 GHz WiFi applications and in the second transmit mode and/or the second receive mode for broadband WiFi applications.

In some examples, the filter 220 may be applied or removed such that the FEM 200 operates in accordance with one or more performance regulations. In one example, the filter 220 may be applied or removed to meet one or more performance regulations corresponding to the application or location of use. For example, the filter 220 may be applied in a first application or location (e.g., North American market) to meet out OOB noise regulations. Likewise, the filter 220 may be removed in a second application of location (e.g., European market) with reduced or relaxed OOB noise regulations.

Similarly, the filter 220 may be applied or removed to improve performance on a channel-by-channel basis. For example, the filter 220 may be applied to improve the performance of outer WiFi channels (e.g., CH1, CH11, etc.) by minimizing OOB noise generated by the power amplifier 210 and/or filtering outside noise. Likewise, the filter 220 may be removed for center WiFi channels (e.g., CH6) when minimal filtering is needed. In some examples, by selectively applying the filter 220 on a channel-by-channel basis, the efficiency of the amplifiers 210, 270 can be improved.

In addition, applying the filter 220 on a channel-by-channel basis can improve the performance (e.g., range) of the FEM 200. For example, by selectively applying the filter 220 to outer WiFi channels, the power amplifier 210 may provide desired output power levels for optimal performance without generating unacceptable levels of 00B noise. In one example, the FEM 200 may be operated such that the output power levels of the outer WiFi channels are substantially the same as the output power levels of the inner WiFi channels. As such, performance similar to that of the center WiFi channels may be achieved for the outer WiFi channels.

As shown in FIG. 2, the components of the FEM 200 (e.g., the filter 220, the switch matrix 280, etc.) are included in a package 290. In some examples, being that the components of the FEM 200 are included in a compact arrangement within the package 290, overall path losses between components can be reduced. In addition, the components of the FEM 200 may be matched to different impedances (i.e., non-standard impedances) and/or directly matched to one another. For example, being that the switch matrix 280 and the filter 220 are included within the FEM 200 (and the package 290), other components may be matched closely to the impedances of the switch matrix 280 and/or the filter 220 (or vice versa), rather than a standard impedance (e.g., 50 ohms). Likewise, the output of the power amplifier 210 may have a first impedance (e.g., 2-6 ohms) and the filter 220 may have a second impedance (e.g., 30 ohms). Rather than matching the both the power amplifier 210 and the filter 220 to a standard impedance (e.g., 50 ohms), the output of the power amplifier 210 may be matched directly to the second impedance of the filter 220. As such, performance within the FEM 200 may be more consistent due to improved impedance control and minimized impedance transformation losses.

In certain examples, by minimizing impedance transformation losses, the FEM 200 can operate at reduced power levels. For example, power consumption of the FEM 200 may be lower due to improved component-to-component impedance matching, allowing the FEM 200 to provide maximum output power with improved efficiency. As such, in some examples, the FEM 200 may include components with lower power ratings, reducing size and cost of the FEM 200.

Figure 3:
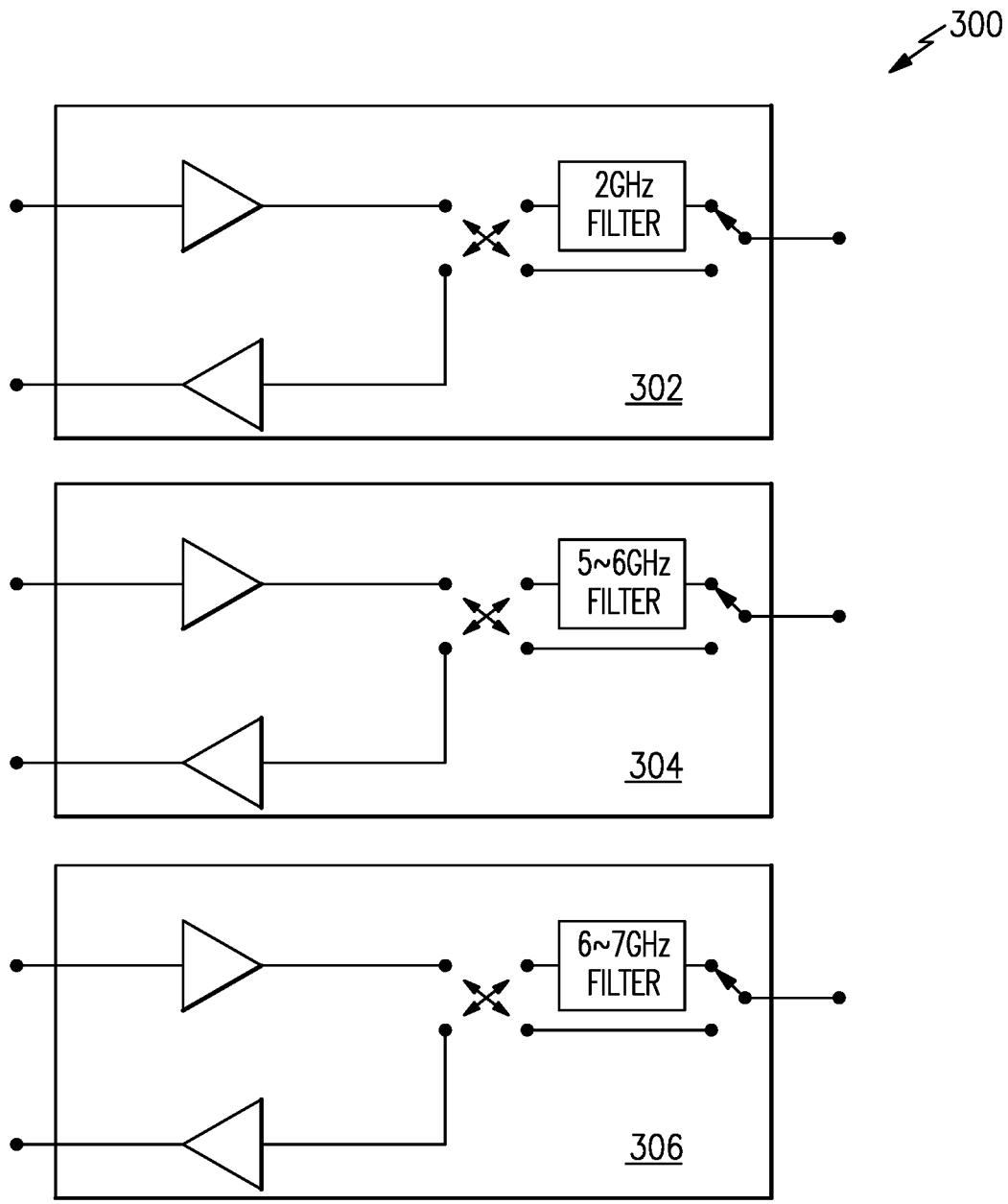
FIG. 3 is a block diagram of a front end module arrangement in accordance with aspects described herein.

As described above, the FEM 200 may be configured as a WiFi FEM and included in a wireless device that communicates over WiFi. In some examples, multiple FEMs may be included in such wireless devices to provide additional configurability options. For example, FIG. 3 is a block diagram illustrating a FEM arrangement 300 in accordance with aspects described herein. As shown, the FEM arrangement 300 includes a first FEM 302, a second FEM 304, and a third FEM 306. In one example, each of the FEMs 302, 304, and 306 corresponds to the FEM 200 of FIG. 2. In some examples, the FEMs 302, 304, and 306 may be configured for different WiFi operating frequencies (or bands). For example, the first FEM 302 may be configured for 2 GHz WiFi applications, the second FEM 304 may be configured for 5~6 GHz WiFi applications, and the third FEM 306 may be configured for 6~7 GHz WiFi applications. In some examples, each of the FEMs 302, 304, and 306 may be coupled to a common antenna port (e.g., antenna port 240). In other examples, each of the FEMs 302, 304, and 306 may be coupled to different antennae, or the lower frequency FEM 302 may be coupled to one antenna, and the mid and high frequency FEMs 304 and 306 may be coupled to a different antenna. In still other examples, the FEM arrangement 300 may include a different number of FEMs and the FEMs may be configured for different frequencies/applications.

It should be appreciated that while the FEM 200 and the FEM arrangement 300 have been described above with reference to various WiFi applications, similar FEM architectures may be used in different wireless applications. For example, the FEM 200 and/or the FEM arrangement 300 may be configured for use in Wireless Local Area Network (WLAN), Ultra-Wideband (UWB), Wireless Personal Area Network (WPAN), 4G cellular, LTE cellular, and 5G cellular applications.

In some examples, one or more components of the FEM 200 may include Gallium Arsenide (GaAs) Heterojunction Bipolar Transistors (HBT) and/or Silicon Germanium (SiGe) HBTs. In certain examples, the FEM 200 or one or more components of the FEM 200 may be fabricated using silicon on insulator (SOI) techniques.

Embodiments of the FEM 200 described herein may be advantageously used in a variety of electronic devices. Examples of the electronic devices can include, but are not limited to, consumer electronic products, parts of the consumer electronic products, electronic test equipment, cellular communications infrastructure such as a base station, etc. Examples of the electronic devices can include, but are not limited to, an IEEE 802.11ax access point, a router, a gateway, a mobile phone such as a smart phone, a telephone, a television, a computer monitor, a computer, a modem, a hand held computer, a laptop computer, a tablet computer, an electronic book reader, a wearable computer such as a smart watch, a personal digital assistant (PDA), an appliance, such as a microwave, refrigerator, or other appliance, an automobile, a stereo system, a DVD player, a CD player, a digital music player such as an MP3 player, a radio, a camcorder, a camera, a digital camera, a portable memory chip, a health care monitoring device, a vehicular electronics system such as an automotive electronics system or an avionics electronic system, a peripheral device, a wrist watch, a clock, etc. Further, the electronic devices can include unfinished products.

As such, an improved front end module (FEM) is provided herein. In at least one embodiment, the FEM includes a filter and a switch matrix configured to selectively apply or remove the filter from the transmit and receive paths of the FEM. In some embodiments, component impedances can be matched within the FEM to reduce losses and improve performance.

Having described above several aspects of at least one embodiment, it is to be appreciated various alterations,

What is claimed is:

1. A front end module for a wireless device comprising:
an input port configured to receive an input radio frequency signal;
a power amplifier coupled to the input port and configured to amplify, in a transmit mode of operation, the input radio frequency signal to provide a first radio frequency signal;
an antenna port configured to be coupled to an antenna, to receive a second radio frequency signal from the antenna in a receive mode of operation, and to transmit the first radio frequency signal from the power amplifier to the antenna in the transmit mode of operation;
a low-noise amplifier configured, in the receive mode of operation, to amplify the second radio frequency signal received from the antenna port;
an output port configured to receive the amplified second radio frequency signal from the low-noise amplifier;
a transmit path coupled between the power amplifier and the antenna port and configured to provide, in the transmit mode of operation, the first radio frequency signal from the power amplifier to the antenna port;
a receive path coupled between the low-noise amplifier and the antenna port and configured to provide, in the receive mode of operation, the second radio frequency signal from the antenna port to the low-noise amplifier;
a filter; and
a first switching circuit positioned in the transmit and receive paths and configured to selectively apply the filter to the transmit path and/or the receive path, the first switching circuit having a first transmit mode in which the filter is coupled in the transmit path, a first receive mode in which the filter is coupled in the receive path, a second transmit mode in which the filter is not present in the transmit path and a second receive mode in which the filter is not present in the receive path.

2. The front end module of claim 1 wherein the first switching circuit is a switch matrix.

3. The front end module of claim 1 wherein the first transmit and receive modes of operation correspond to a first geographic location of use of the front end module and the second transmit and receive modes of operation correspond to a second geographic location of use of the front end module.

4. A front end module for a wireless device comprising:
an input port configured to receive an input radio frequency signal;
a power amplifier coupled to the input port and configured to amplify, in a transmit mode of operation, the input radio frequency signal to provide a first radio frequency signal;
an antenna port configured to be coupled to an antenna, to receive a second radio frequency signal from the antenna in a receive mode of operation, and to transmit the first radio frequency signal from the power amplifier to the antenna in the transmit mode of operation;
a low-noise amplifier configured, in the receive mode of operation, to amplify the second radio frequency signal received from the antenna port;
an output port configured to receive the amplified second radio frequency signal from the low-noise amplifier;
a transmit path coupled between the power amplifier and the antenna port and configured to provide, in the transmit mode of operation, the first radio frequency signal from the power amplifier to the antenna port;
a receive path coupled between the low-noise amplifier and the antenna port and configured to provide, in the receive mode of operation, the second radio frequency signal from the antenna port to the low-noise amplifier;
a filter; and
a first switching circuit positioned in the transmit and receive paths and configured to selectively apply the filter to the transmit path and/or the receive path, the first switching circuit being configured to apply the filter to the transmit path and/or the receive path in a first mode of operation and to remove the filter from the transmit path and/or the receive path in a second mode of operation, the first radio frequency signal being configured to be transmitted in a channel of a plurality of channels corresponding to a WiFi band, and the front end module being configured to switch between the first and second modes of operation on a channel-by-channel basis.

5. The front end module of claim 4 wherein the front end module is configured to operate in the first mode of operation when transmitting in an outer channel of the plurality of channels and in the second mode of operation when transmitting in an inner channel of the plurality of channels.

6. The front end module of claim 5 wherein operating in the first mode of operation when transmitting in outer channels and in the second mode of operation when transmitting in inner channels allows the front end module to transmit the first radio frequency signal at a substantially similar power level across the plurality of channels while minimizing out of band noise generation.

7. The front end module of claim 4 further comprising a second switching circuit configured to selectively couple the antenna port to one of the filter and the first switching circuit.

8. The front end module of claim 7 wherein the second switching circuit is a single pole double throw switch.

9. The front end module of claim 7 wherein the power amplifier, the low-noise amplifier, the filter, the first switching circuit, and the second switching circuit are integrated in a common package.

10. The front end module of claim 9 wherein at least two of the power amplifier, the low-noise amplifier, the filter, the first switching circuit, and the second switching circuit have impedances that are directly matched to reduce impedance transformation losses.

11. A front end module for a wireless device comprising:
an input port to receive a first radio frequency signal;
a power amplifier coupled to the input port and configured to amplify the first radio frequency signal;
an antenna port to provide the amplified first radio frequency signal to an antenna;
a first transmit path including a filter;
a first receive path including the filter;
a second transmit path not including any filter;
a second receive path not including any filter;
a switch including a first contact coupled to the first transmit and receive paths path, a second contact coupled to the second transmit and receive paths, and a third contact coupled to the antenna port; and a switching circuit configured to selectively couple the power amplifier to the antenna port via one of the first transmit path and the second transmit path.

12. The front end module of claim 11 wherein the switching circuit is configured to couple the power amplifier to the antenna port via the first transmit path in a first mode of operation and to couple the power amplifier to the antenna port via the second transmit path in a second mode of operation.

13. The front end module of claim 12 wherein the front end module is configured to operate in the first mode of operation for a first geographic location of use and the second mode of operation for a second geographic location of use.

14. A front end module for a wireless device comprising:
an input port to receive a first radio frequency signal;
a power amplifier coupled to the input port and configured to amplify the first radio frequency signal;
an antenna port to provide the amplified first radio frequency signal to an antenna;
a first transmit/receive path including a filter;
a second transmit/receive path;
a switch including a first contact coupled to the first transmit/receive path, a second contact coupled to the second transmit/receive path, and a third contact coupled to the antenna port; and
a switching circuit configured to selectively couple the power amplifier to the antenna port via one of the first transmit/receive path and the second transmit/receive path, the switching circuit being configured to couple the power amplifier to the antenna port via the first transmit/receive path in a first mode of operation and to couple the power amplifier to the antenna port via the second transmit/receive path in a second mode of operation, the first radio frequency signal being configured to be transmitted in a channel of a plurality of channels corresponding to a WiFi band, and the front end module being configured to switch between the first and second modes of operation on a channel-by-channel basis.

15. The front end module of claim 14 wherein the front end module is configured to operate in the first mode of operation when transmitting in an outer channel of the plurality of channels and in the second mode of operation when transmitting in an inner channel of the plurality of channels.

16. The front end module of claim 15 wherein operating in the first mode of operation when transmitting in outer channels and in the second mode of operation when transmitting in inner channels allows the front end module to transmit the first radio frequency signal at a substantially similar power level across the plurality of channels while minimizing out of band noise generation.

17. The front end module of claim 14 further comprising an output port and a low noise amplifier, the low-noise amplifier being configured to amplify a second radio frequency signal received from the antenna port and provide the amplified second radio frequency signal to the output port.

18. The front end module of claim 17 wherein the switching circuit is further configured to selectively couple the low noise amplifier to the antenna port via one of the first transmit/receive path and the second transmit/receive path.

19. The front end module of claim 18 wherein the switching circuit is configured to couple the low-noise amplifier to the antenna port via the first transmit/receive path in the first mode of operation and to couple the low-noise amplifier to the antenna port via the second transmit/receive path in the second mode of operation.

20. The front end module of claim 17 wherein the power amplifier, the low-noise amplifier, the filter, the switch, and the switching circuit are integrated in a common package.

21. The front end module of claim 20 wherein at least two of the power amplifier, the low-noise amplifier, the filter, the switch, and the switching circuit have impedances that are directly matched to reduce impedance transformation losses.

* * * * *

UNITED STATES PATENT AND TRADEMARK OFFICE
CERTIFICATE OF CORRECTION

| | | |
|---|---|---|
| PATENT NO. | : 12,063,058 B2 | Page 1 of 1 |
| APPLICATION NO. | : 17/667363 | |
| DATED | : August 13, 2024 | |
| INVENTOR(S) | : Jose Mari Elizalde Harrison | |

It is certified that error appears in the above-identified patent and that said Letters Patent is hereby corrected as shown below:

In the Claims

Column 10, Line 65, Claim number 11, delete "path".

Signed and Sealed this
Twenty-fourth Day of September, 2024

Katherine Kelly Vidal
*Director of the United States Patent and Trademark Office*